United States Patent
Fouvet et al.

(10) Patent No.: US 6,776,843 B2
(45) Date of Patent: Aug. 17, 2004

(54) SPRAYER DEVICE FOR A MOTOR VEHICLE BODY PAINT SPRAY BOOTH

(75) Inventors: Michel Fouvet, Champagnier (FR); Jose Rodrigues, Saint-Guillaume (FR)

(73) Assignee: Eisenmann France Sarl (FR)

( * ) Notice: Subject to any disclaimer, the term of this patent is extended or adjusted under 35 U.S.C. 154(b) by 0 days.

(21) Appl. No.: 10/182,983

(22) PCT Filed: Jan. 29, 2001

(86) PCT No.: PCT/FR01/00273

§ 371 (c)(1), (2), (4) Date: Dec. 24, 2002

(87) PCT Pub. No.: WO01/56705

PCT Pub. Date: Aug. 9, 2001

(65) Prior Publication Data

US 2003/0136336 A1 Jul. 24, 2003

(30) Foreign Application Priority Data

Jan. 31, 2000 (FR) .......................... 00 01200

(51) Int. Cl.[7] ................................. B05C 5/00
(52) U.S. Cl. ................ 118/323; 118/324; 427/421; 901/43
(58) Field of Search ............. 901/43; 118/323, 118/324; 427/421

(56) References Cited

U.S. PATENT DOCUMENTS

| 4,218,166 A | * | 8/1980 | Abu-Akeel et al. ............. 414/1 |
| 4,367,532 A |  | 1/1983 | Crum et al. |
| 4,611,695 A |  | 9/1986 | Kato et al. |
| 4,984,745 A |  | 1/1991 | Akeel et al. |
| 5,273,059 A | * | 12/1993 | Gross et al. ................ 118/668 |
| 5,358,568 A | * | 10/1994 | Okano et al. ............... 118/323 |
| 5,645,895 A | * | 7/1997 | Murayama et al. ......... 427/424 |
| 6,177,139 B1 | * | 1/2001 | Rouvelin .................... 427/421 |

FOREIGN PATENT DOCUMENTS

| DE | 2228598 | 1/1974 |
| EP | 0341134 | 11/1989 |
| EP | 0618013 | 10/1994 |
| FR | 1307444 | 3/1963 |
| FR | 2710858 | 4/1995 |
| FR | 2777483 | 10/1999 |

* cited by examiner

Primary Examiner—Richard Crispino
Assistant Examiner—Michelle Acevedo Lazor
(74) Attorney, Agent, or Firm—Cantor Colburn LLP

(57) ABSTRACT

A device is provided for spraying a coating product including a moving arm able to perform a tracking movement for tracking an object to be coated which is moving in a horizontal plane along an axis of conveying, a sprayer disposed at an end of the moving arm, and a base on which the moving arm is pivotably disposed, the base is rotatable about an axis generally horizontal and generally perpendicular to the axis of conveying and the base is translatable.

10 Claims, 5 Drawing Sheets

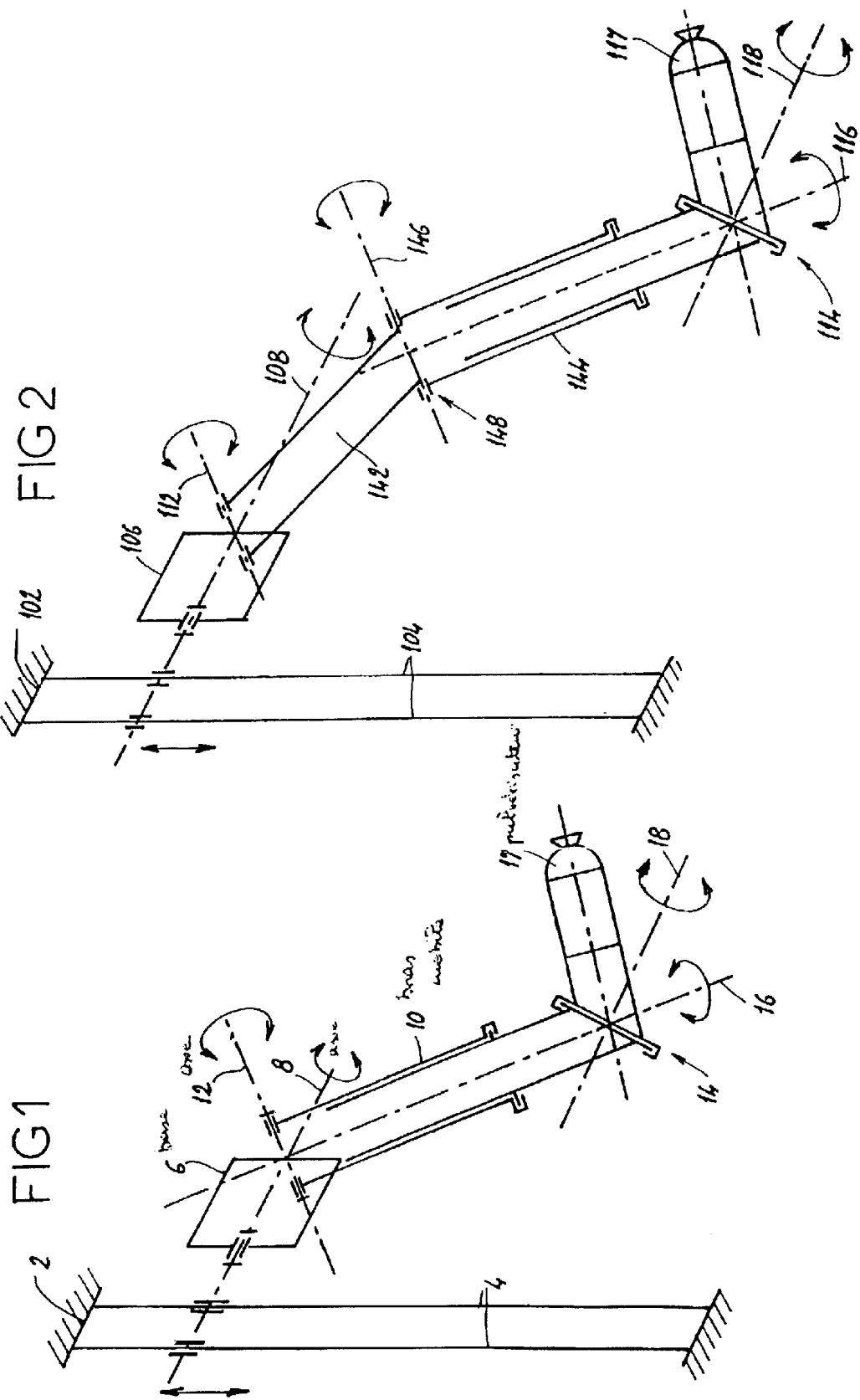

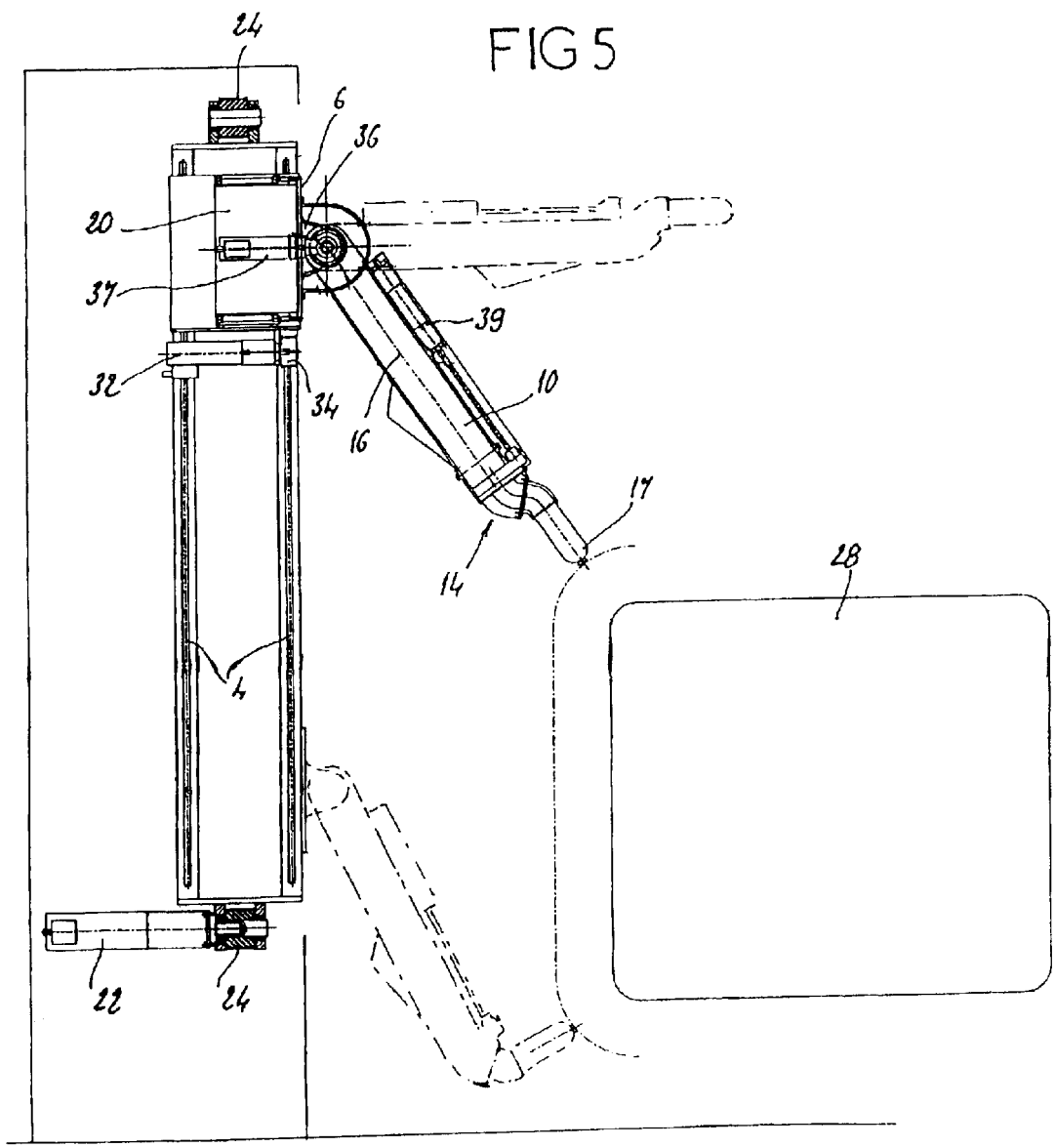

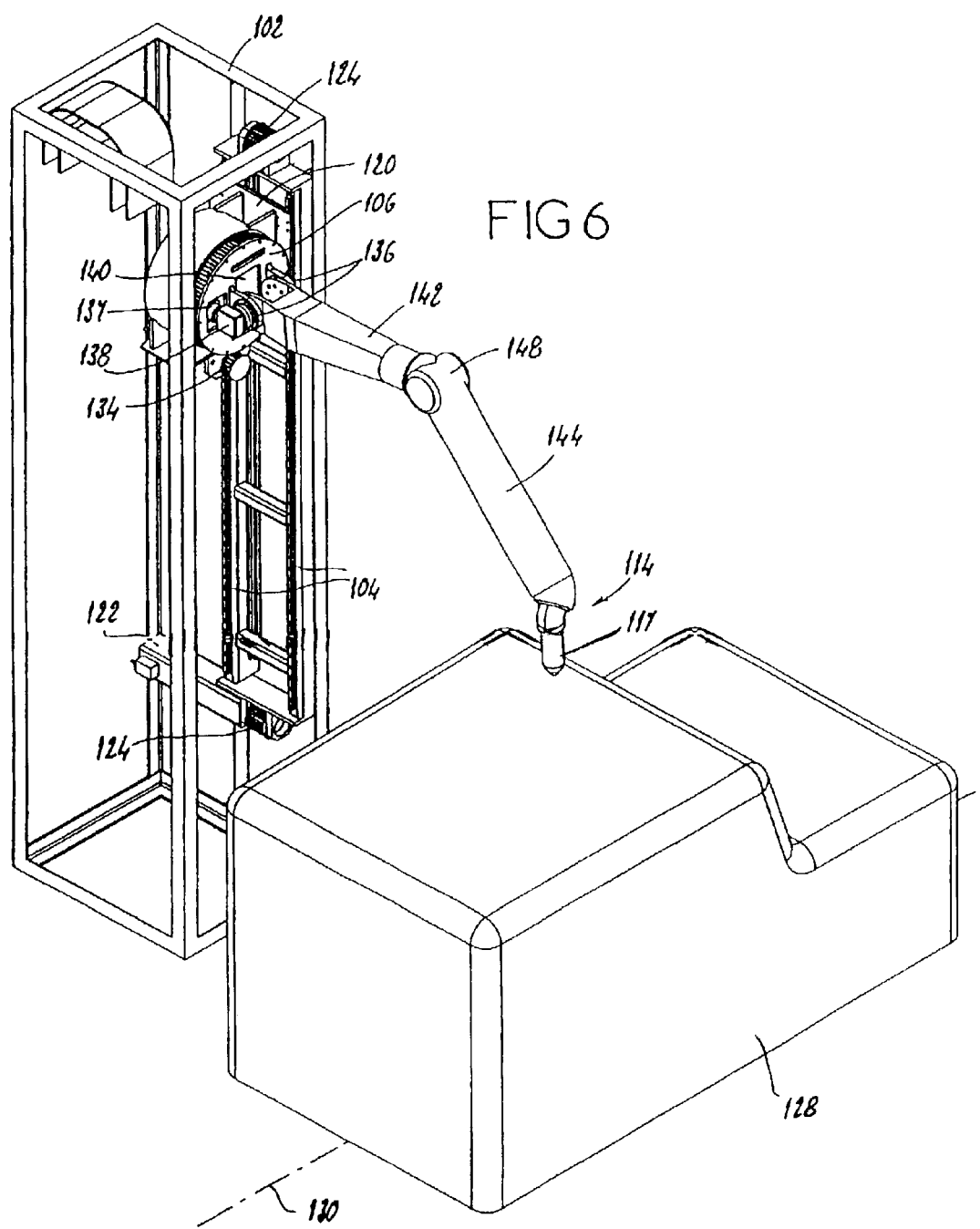

SPRAYER DEVICE FOR A MOTOR VEHICLE BODY PAINT SPRAY BOOTH

FIELD OF INVENTION

The invention relates to a spray device and, more particularly, a spray device for a paint booth for car bodywork.

DESCRIPTION OF RELATED ART

To paint motor vehicle bodywork, a coating product is sprayed in liquid or powder form onto the bodywork. To avoid sprays of the product from being sprayed outside of the painting zone, the bodywork is conveyed into a tunnel-shaped booth equipped with an air lock and ventilated from the top downwards. Inside this booth there are sprayers which send a coating product, particularly paint, onto the bodywork that is to be painted.

In order to disturb the atmosphere within the booth as little as possible and to avoid various dirt which gives rise to defects in the form of inclusions in the painted parts, it is known practice for the motor elements needed for spraying coating onto the bodywork to be placed outside the booth in an attempt to leave only the sprayers inside the booth. Thus, document FR-2 710 858 describes a machine for applying paint comprising a system of overlapping curtains allowing only the sprayer and the arm supporting it to be placed inside the booth while the other mechanical parts are placed outside the booth. That makes it possible to limit the cleaning operations to the sprayer and its support arm, and to the relatively smooth walls of the booth and of the overlapping curtains.

The disadvantage with such a machine is, however, its bulk both in the longitudinal direction, that is to say in the direction of the axis of the conveyor on which the bodywork moves and also in the transverse direction. Indeed conventionally, a booth for applying paint comprises three lateral machines on each side of the conveyor and one machine intended to spray coating product onto the upper parts of the bodywork. In order to be able to save on the cycle time taken to paint a bodywork and in order to be able to paint the bodywork parts situated transversely to the axis of the conveyor, such as the fronts and the rears from a constant distance, the machines have a degree of freedom, generally known as the track, parallel to the axis of the conveyor. In the case of lateral machines, the "track" is generally about 600 to 800 mm. These machines therefore have a relatively long length in the direction of the axis of the conveyor.

In addition, it is necessary to leave a sufficient gap between two machines so as to avoid the sprayers painting each other. A distance generally observed between two sprayers is 1100 mm. It is also necessary for the operators responsible for the paint booth to be able visually to check the application of paint to the bodywork. For that, a sufficiently large glazed area needs to be provided between two adjacent machines.

All of these constraints mean that the booths have a relatively long length with respect to the axis of the conveyor. Likewise, the construction of the machines of the prior art entails the need to have an axis of penetration transversal to the axis of the conveyor with sufficient travel to be able to follow the curvature of the bodywork and also to be able to adapt to suit bodywork of different widths. The machine thus has a transverse travel which entails increasing the depth of the structure of the machines. This then yields a mechanical part of relatively great width on the outside of the booth.

On the whole, paint booths and associated machines have a relatively great length and width with respect to the axis of the conveyor. With a view to reducing the operating costs, particularly the costs associated with the air flow and the cleaning costs, it is important to reduce both the length and the width of the equipment alongside a conveying line through a workshop. This is because each square meter of workshop represents a substantial investment and an annual operating cost which are of course passed on to the cost of the end product.

Document FR-2 777 483 proposes arrangements that make it possible to reduce the number of sprayers in a complete station for spraying coating product by proposing a method of spraying coating product which, in practice, makes it possible to have just two lateral application machines instead of the three machines usually used. What happens is that as the production rates often vary rapidly with the demand, adaptation is achieved by increasing the number of sprayers linearly with relation to production:

3 up to 2 m/min, 7 from 2 to 3.5 m/min, 9 above that.

However, this solution entails including tracks in the lateral machines and this, at the end of the day, does not make it possible to reduce the width of the complete painting station.

Another disadvantage of the application machines described hereinabove is their lack of flexibility. Motor manufacturers are increasingly wanting to have the ability to manufacture any model in their range on any given assembly line. Likewise, when a new model comes out, the style of which may lead to zones which are more difficult to access for painting, the manufacturer wants to be able to keep his painting installations that he used for the older models. Now, in the case of the conventional machines as described hereinabove, the points that the kinetics of the machine can access are limited, and it can no longer be guaranteed that it will be possible to paint the new vehicles without requiring touch-ups.

Likewise, the speeds of the conveyor transporting the bodywork are constantly increasing with a view to making the production tooling even more profitable and thus to reducing the final cost of the manufactured product. This increase in the speed of the conveyors in the current state of the art involves increasing the track lengths of the machines that apply the protective coating. To increase this track in machines of the prior art it is then necessary to increase the length along the axis of the conveyor of the application stations and this goes against the search for economy set out above.

An installation as described hereinabove obviously comprises numerous control and measurement members which are generally grouped together into a series of electro-pneumatic cabinets situated around the spray booth. These members may just as easily be placed in a unit fixed to the back of each machine as disclosed in patent EP-B1-0618013. In both instances, this leads to the occupation of additional floor space and therefore to more expensive investments.

To spray a coating product onto a car bodywork or the like, it is also known practice to use robots. Patent U.S. Pat. No. 4,984,745 discloses such a robot which comprises a fixed base on which is mounted to pivot, about a vertical axis, a rotating base. The latter carries an articulated arm equipped at its free end with a wrist bearing a sprayer.

Such a robot allows a bodywork to be tracked on a conveyor over a greater distance than the machines described earlier.

However, such a robot has numerous disadvantages. Specifically, the robot is placed almost entirely in the spray booth. Problems of deposits on the entire robot, not only the arm supporting the sprayer but also the fixed base and the moving base are then encountered. This poses problems as regards the cleaning of the installation, which takes a relatively long length of time and generates bodywork defects in the form of inclusions.

Another disadvantage with these robots is that they are placed at the end of the conveyor and that their bulk in the widthwise direction, that is to say transversely to the axis of the conveyor, is relatively great. This bulk is of the order of 20% greater than that of the machines described above, and the booth is therefore more expensive to operate both in terms of energy and from an ecological standpoint.

BRIEF SUMMARY OF INVENTION

The invention provides a device for applying a coating product that makes it possible to produce an application station which has a small floor space occupancy. As a preference, this device will have a long track length, great flexibility and will comprise machines placed essentially outside the application booth.

To this end, the present invention proposes a device for spraying a coating product intended in particular for a paint booth for spraying car bodywork, comprising a moving arm able to perform a tracking movement tracking the object that is to be coated, which is moving in a horizontal plane along a conveyor or the like, and at the free end of which a sprayer is placed.

The pivoting arm is mounted on a base which can be given a rotational movement about an axis that is roughly horizontal and roughly perpendicular to the axis of conveying. Furthermore, in order to be able to provide the tracking movement, another degree of freedom is needed. In a first form of embodiment, this degree of freedom is given by a translation along an essentially vertical or horizontal axis of the rotary base carrying the arm and, in another embodiment, this degree of freedom is given by virtue of the presence of an articulation forming an elbow on the arm carrying the sprayer.

When the device comprises an articulated arm, the base may also be moved in translation in a vertical or horizontal direction. The device then has an additional degree of freedom. This configuration makes it possible simply to increase the flexibility of the machine still further, allowing it to reach remoter points.

As a preference, a wrist is mounted between the free end of the arm and the sprayer. In this case, the wrist has, for example, two degrees of freedom and can rotate, on the one hand, about a longitudinal axis with respect to the arm or to that part of the arm which carries it and, on the other hand, about an axis inclined about this longitudinal axis. For example, the angle of inclination of this axis is of the order of 45°.

For a device according to the invention comprising an articulated arm with an elbow, the axis of the elbow is advantageously parallel to the axis of pivoting of the arm on the base.

The present invention also relates to an installation for spraying parts, particularly car bodywork, which comprises at least one spray device as described hereinabove.

Such an installation comprises, for example, on each side of a conveyor, two spray devices as described hereinabove with five degrees of freedom and one spray device according to the invention comprising six degrees of freedom.

To limit dirtying, which makes it possible to avoid defects in the form of inclusions in the painted bodyworks, and to reduce cleaning times to a minimum, the installation advantageously comprises a wall passing more or less level with the face of the base carrying the articulated or unarticulated arm of a device according to the invention, the axis of pivoting of the arm on the base being placed with respect to the wall inside the installation, that is to say on the conveyor side.

Thus, it is possible in such a machine to conceive of a location that allows the control and measurement members to be sited. This location may be incorporated directly into the structure of the machine without appreciably increasing its volume. This then yields a machine which has a track far longer than that of the machines of the prior art and that incorporates its own electric control cabinet in a volume equivalent to that of the machines of the prior art.

BRIEF DESCRIPTION OF THE DRAWINGS

In any event, the invention will be clearly understood from the description which follows, with reference to the appended schematic drawing, which, by way of nonlimiting examples, depicts two embodiments of a spraying device according to the invention.

FIG. 1 is an outline diagram showing the various degrees of freedom of a first machine according to the invention, FIG. 2 is an outline diagram showing the various degrees of freedom of a second machine according to the invention, FIG. 5 is a view in elevation of the machine depicted in FIGS. 3 and 4, and FIG. 6 is a perspective view of a machine built on the principle of FIG. 2.

DETAILED DESCRIPTION OF THE INVENTION

Figure 3:
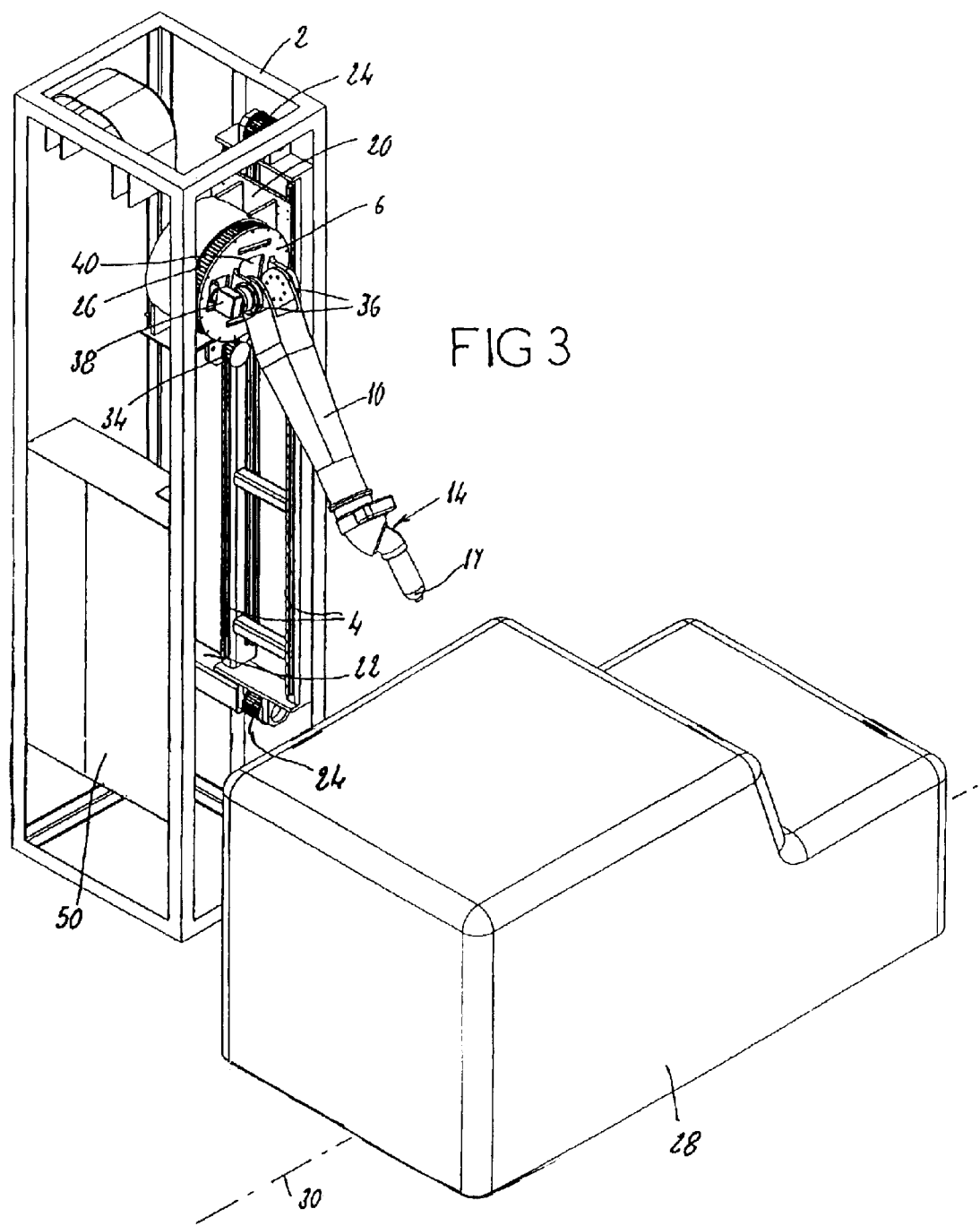
FIG. 3 is a perspective view of a machine constructed on the principle of FIG. 1.

A structure 2 of a machine extending roughly vertically is shown in outline in FIG. 1. Vertical guide rails 4 allow a carriage carrying a base 6 to move in vertical translation. This base is mounted to pivot about a horizontal axis 8. An arm 10 is mounted to pivot about an axis 12 on the base 6. The axis 12 is arranged in a plane perpendicular to the axis 8. The free end of the arm 10 is equipped with a wrist 14 carrying a sprayer 17. The wrist 14 has two degrees of freedom. First of all, it is mounted to pivot about the longitudinal axis 16 of the arm 10 and also, it has a degree of freedom in rotation about an axis 18 inclined by 45° with respect to the axis 16.

FIG. 3 shows a machine produced according to the principle of figure 1. This figure shows the structure 2 carrying the two vertical guide rails 4. A carriage 20 is mounted to slide on the two guide rails 4. This carriage is driven using an electric servomotor 22. Mounted on the output shaft of this electric motor is a toothed wheel 24 intended to receive a toothed belt, not depicted in the drawing. The servomotor is mounted just below the guide rails 4. Above these guide rails is arranged a second toothed wheel 24, roughly identical to the first, and which also receives the toothed belt. The carriage 20 is fixed to the toothed belt. The movement of the carriage 20 is therefore controlled by the servomotor 22. End-of-travel sensors may of course also be provided to stop the motor 22.

FIG. 3 schematically depicts, apart from the structure 2 and the corresponding machine, a car bodywork 28. This bodywork is placed on a conveyor for moving the bodywork along a horizontal axis 30. The structure 2 is arranged at the edge of the conveyor, some distance from the bodywork 28. The two guide rails 4 are parallel and define a plane which is perpendicular to the conveying axis 30.

The base 6 is in the form of a disk provided at its periphery with teeth 26. The disk 6 is arranged in a vertical plane parallel to the conveying axis 30. The axis 8 about which the base 6 can pivot corresponds to the axis of revolution of this disk. This axis is horizontal and perpendicular to the conveying axis 30. Rotation of the base 6 is provided by a servomotor 32 (FIG. 5) the axis of which is parallel to the axis 8. Mounted at the end of the output shaft of this servomotor 32 is a toothed wheel 34 the teeth of which correspond to the teeth 26 of the base 6.

On the conveyor side, the base 6 bears bearings 36 defining the axis 12 of pivoting of the arm 10. This axis 12 lies in a plane parallel to the plane containing the base 6, that is to say in a vertical plane parallel to the conveying axis 30. The pivoting of the arm 10 is controlled by a third servomotor placed inside the carriage 20 and carried by the base 6. The movement of the motor is transmitted to the arm 10 via a turn device 38.

The drive means allowing the wrist to move about the longitudinal axis 16 of the arm 10 comprises an electric servomotor 39 placed under a cover on the outside of the arm 10. A system involving a toothed wheel and a toothed annulus allows the wrist to rotate about the axis 16. As to the drive means for the rotational movement about the axis 18 inclined (at 45°) with respect to the longitudinal axis 16, these are arranged inside the arm 10 and are not depicted in the drawing. Here again, we find a servomotor directly or via a turn device providing the corresponding movement. These drive means are powered from inside the arm 10. An opening 14 is made in the base 6 to allow the ducts necessary for powering and controlling these drive means to pass. This opening 40 also allows the sprayer 17 to be supplied with coating product.

Figure 4:
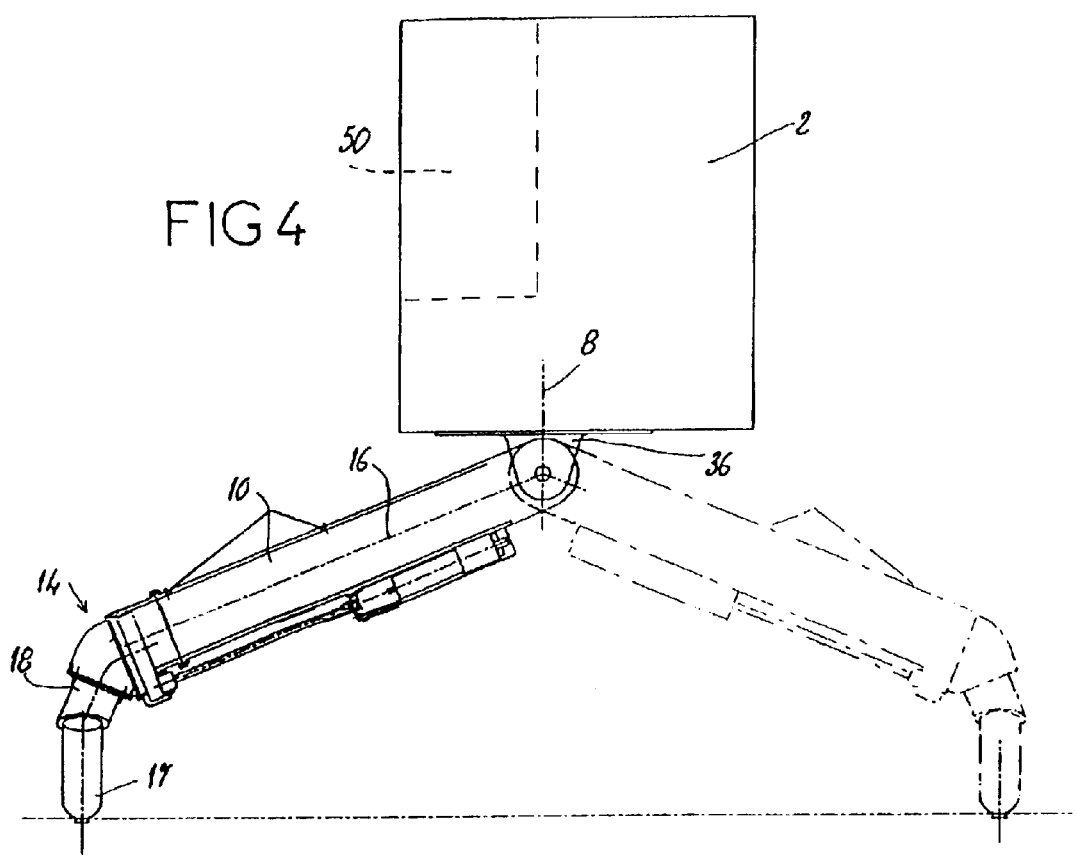
FIG. 4 is a view from above of the machine of FIG. 3.

As can be seen in FIG. 3, the space occupied by the carriage 20, the guide rails 4 and the other mechanical elements in the structure 2 is relatively restricted. Provision is therefore made for an electric cabinet 50 grouping together the electric and/or pneumatic control members and ant measurement members that there might be to be arranged in this structure 2. This cabinet 50 may be arranged as depicted in FIGS. 3 and 4 on the opposite face to the face of the structure 2 that bears the guide rails 4. It could just as easily be on the rear face of the structure, on the opposite side to the arm 20.

FIG. 4 shows a view from above of two positions of spraying of the machine depicted in FIG. 3 in the direction of the axis of conveying 30. Between the two extreme positions depicted, one in heavy line and the other in chain line, there is a distance corresponding approximately to twice the length of the arm 10. By providing an arm 10 about one meter long, this spray device therefore has the possibility of tracking the car bodywork 28 over about two meters. This tracking distance is very markedly greater than the tracking distance of the machines of the prior art. By virtue of the rising and falling movement along the guide rails 4 and of the possibility of pivoting of the base 6, all the intermediate positions between the two extreme positions depicted in FIG. 4 can be adopted by the sprayer. The two axes of the wrist make it possible to have a sprayer which is always roughly perpendicular to the surface of the bodywork that is to be coated. The sprayer 17 is here intended to spray a coating product on roughly vertical surfaces of the car bodywork 28.

It will be noted that, although it allows the bodywork to be tracked for a length of about two meters, the structure 2 may be far narrower in width than this track distance. Thus, it is possible, to provide a large glazed area for monitoring the work of the machine, between two adjacent machines.

As far as protection against overspray of covering product from the machine is concerned, it can be noted that it is possible here to have a wall of the booth passed roughly level with the base 6 of the machine. The axis of pivoting of the arm 10 is then as close as possible to the wall of the booth, on the inside thereof. To protect all of the mechanical part inside the structure 2, it is possible to use a system of curtains such as, for example, disclosed in document FR-2 710 858. Here, there is no need to have overlapping curtains but simply a pair of curtains in order to follow the vertical translational movement of the carriage 20.

FIG. 5 shows by way of example a few positions that the arm 10 and the sprayer 17 can adopt with respect to a car bodywork with a view to painting the latter. Just as FIG. 4 shows the great flexibility of the depicted machine in the longitudinal direction of the conveying axis 30, FIG. 5 shows the great flexibility of this machine in a vertical direction.

FIG. 2 shows the principle of a second machine according to the invention. Again we have a structure 102 in which two vertical guide rails 104 are arranged. A carriage 120 slides along the guide rails 104. This carriage therefore has a movement of vertical translation. It carries a base 106 mounted to pivot with respect to a horizontal axis 108. The base 106 carries an articulated arm. Here, this arm consists of an arm 142 and of a forearm 144. The arm 142 is mounted to pivot on the base 106 about an axis 112. The latter is arranged in a vertical plane perpendicular to the axis 108. The end of the arm 142 which is the opposite end to the base 106 carries the forearm 144. This forearm 144 and this arm 142 are articulated about an axis 146 parallel to the axis 112. An elbow 148 is thus produced.

The forearm 144 is comparable to the arm 10 described previously with reference to FIG. 1. At its end it carries a wrist 114 which has two degrees of freedom. This wrist can rotate about the longitudinal axis 116 of the forearm 144 and about an axis 118 arranged at an angle with respect to the longitudinal axis 116, for example 45°. This wrist 114 carries a sprayer 117 at its free end.

This second form of embodiment therefore has an additional axis of articulation with respect to the embodiment according to the principle described with reference to FIG. 1. As illustrated in FIG. 6, this form of embodiment makes it possible to conceive of covering wider zones of car bodywork 128 moving along a conveyor of axis 130.

In the machine depicted in FIG. 6, there is again a structure 102, a carriage 120 and mechanical drive means which are similar to those described with reference to FIG. 3. The same references as in FIGS. 3 to 5 are used again here, but increased by the number 100. Once again there is a servomotor 122 driving toothed wheels 124 for driving the carriage 120 via a toothed belt not depicted in the drawing. Likewise, the base 106 is in the form of a disk having peripheral teeth 126. A servomotor, not depicted, makes it possible, via a toothed wheel 134, to control the pivoting of the base 106. Once again there are bearings 136 for bearing the arm 142. Just as was the case for the arm 10 in FIGS. 3 to 5, the arm 142 is driven using a servomotor 137 and a turn device 138. The drive means that allow the various movements of the wrist 114 are similar to the drive means for action on the wrist 14 of FIGS. 3 and 5. These means are not depicted in FIG. 6. As far as movement at the elbow 148 is concerned, a servomotor, not depicted in the drawing, is incorporated into the arm 142. The ducts needed for controlling and powering the drive means in the arm 142 and the forearm 144 are in the form of an opening 140 made in the base 106. This opening also allows the sprayer 117 to be supplied with coating product.

In this form of embodiment, the machine is also arranged along a conveyor and in such a way that the axis 108 is horizontal and roughly perpendicular to the axis of conveying 130. Once again there is a relative arrangement between the structure 102 and the conveyor which is identical to the one described above with respect to the structure 2 and the corresponding conveyor.

By virtue of the additional degree of freedom afforded here, this machine has greater flexibility than the one depicted in FIGS. 3 to 5. This greater flexibility allows it to be used to paint broader regions of the bodywork 128.

To produce a car bodywork painting station it is possible, for example, to conceive of arranging, on each side of a conveyor, three spray machines as depicted in FIGS. 3 to 5. There are thus six spray machines: four machines may be qualified as lateral machines and will be intended to spray a coating product onto roughly vertical walls while the other two machines will be used to spray a coating product onto roughly horizontal surfaces.

In more complicated scenarios it is also possible to use four machines such as the one depicted in FIGS. 3 to 5 and two machines such as the one depicted in FIG. 6. In this case, the first four five-axis machines may be qualified as lateral machines and the other two six-axis machines will be used to spray onto roughly horizontal surfaces.

Finally, it is of course possible to use only six-axis machines, this making it possible to give the application station even more flexibility.

In any event, such a painting station has a reduced bulk, both in the longitudinal direction with respect to the conveyor and in the transverse direction. The fact of having just six machines makes it possible to reduce the length in the longitudinal direction. In the transverse direction, by virtue of the design of these machines for which there is no need to provide a transverse translational movement with respect to the conveyor, it is possible to save about 20% on the width by comparison with currently known painting stations. It is in the transverse direction that the space saving, by comparison with the stations known in the prior art, is the greatest.

Another significant advantage over the "compact" stations of the prior art is the possibility of providing very wide glazed surfaces to make it possible to monitor the progress of the operations performed inside the booth. What actually happens is, as already pointed out above, that the structures of the machines described are not very wide. This allows very considerable glazed surfaces to be installed between two adjacent machines.

As goes without saying, the invention is not restricted to the two preferred embodiments described hereinabove by way of nonlimiting examples; on the contrary, it encompasses all alternative forms of embodiment that fall within the scope of the claims which follow.

Thus, it is possible to conceive of an alternative form of embodiment of the machine depicted in FIG. 6, in which the base carrying the arm and the articulated arm could not move vertically. Such a form of embodiment makes it possible to obtain performance roughly equivalent to the performance obtained with a machine as depicted in FIGS. 3 to 5. In this case, the tracking movement is afforded essentially by the carrying the arm.

Likewise, it is possible to conceive of the five-axis or six-axis machine being mounted not vertically but horizontally: in this case, the axis of movement along the guide rails 4 would become the track and the heightwise adjustment would be achieved by rotation about the axis 12 in the case of the five-axis machine and rotations about the axes 112 and 146 in the case of the six-axis machine. Thus, two machines, one above the other, could be used per side.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for spraying a coating product, comprising:
    a moving arm able to perform a tracking movement for tracking an object to be coated which is moving in a horizontal plane along an axis of conveying;
    a sprayer disposed at an end of the moving arm; and
    a base on which the moving arm is pivotally disposed;
    wherein the base is rotatable about an axis generally horizontal and generally perpendicular to the axis of conveying and the base is vertically translatable.

2. The device as claimed in claim 1, wherein the moving arm is an articulated arm with an elbow.

3. The device as claimed in claim 2, wherein the base is vertically translatable.

4. The device as claimed in claim 2, wherein an axis of the elbow is parallel to an axis of pivoting of the arm on the base.

5. The device as claimed in claim 1, further comprising a wrist disposed between the end of the moving arm and the sprayer.

6. The device as claimed in claim 5, wherein the wrist includes two degrees of freedom and can rotate about a longitudinal axis with respect to the arm, or with respect to a part of the arm on which the wrist is disposed, and about an axis of inclination.

7. The device as claimed in claim 6, wherein the axis of inclination is inclined at approximately 45° relative to the longitudinal axis.

8. A spraying device in which mechanical members are housed in a structure as claimed in claim 1, comprising a cabinet grouping together electrical and/or pneumatic control members and which is built into the structure protecting some of the mechanical members.

9. An installation for spraying a coating product comprising:
    a device for spraying a coating product, comprising:
        a moving arm able to perform a tracking movement for tracking an object to be coated which is moving in a horizontal plane along an axis of conveying;
        a sprayer disposed at an end of the moving arm; and
        a base on which the moving arm is pivotally disposed;
        wherein the base is rotatable about an axis generally horizontal and generally perpendicular to the axis of conveying and the base is vertically translatable.

10. The installation as claimed in claim 9, further comprising a wall level with a face of the base, the axis of pivoting of the arm on the base being placed with respect to the wall inside the installation on a conveyor side.

* * * * *